F. W. VERHAREN.
Shaft-Couplings.

No. 147,714. Patented Feb. 17, 1874.

Witnesses:
Henry C. Ward
D. A. Smith

Inventor.
Fredrick W. Verharen

UNITED STATES PATENT OFFICE.

FREDRICK W. VERHAREN, OF STERLING, ILLINOIS, ASSIGNOR OF ONE-HALF HIS RIGHT TO AUSTIN MORSE, ALPHEUS FOX, ALONZO BARSLEY, AND SAMUEL A. MORSE.

IMPROVEMENT IN SHAFT-COUPLINGS.

Specification forming part of Letters Patent No. 147,714, dated February 17, 1874; application filed January 10, 1874.

*To all whom it may concern:*

Be it known that I, FREDRICK W. VERHAREN, of the city of Sterling, county of Whitesides and State of Illinois, have invented certain Improvements in Shaft-Couplings, of which the following is a specification:

The object of my invention is to provide a convenient, simple, and effectual manner of coupling iron shafts.

Figure 1:
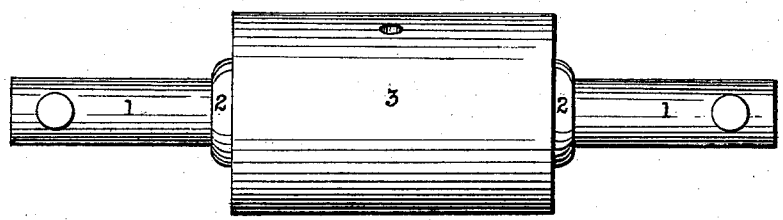
Figure 2:
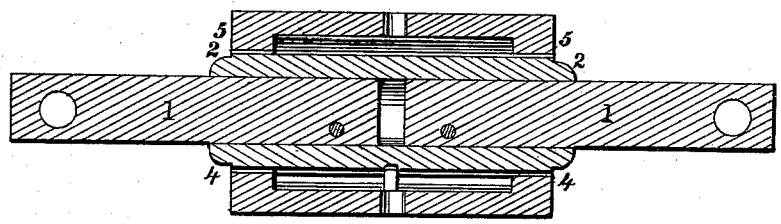
Figure 3:
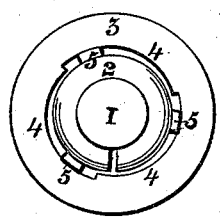

Figure 1 is a machine embodying my invention. Fig. 2 shows one end of an iron shaft inserted in the fixed sleeve 2. Fig. 3 shows the cylinder 3 with the three eccentric cams 4 4 4 at each end.

1 and 1 are the iron shafts to be spliced or coupled, having a hole transversely made through each, near the end to be coupled, and near one side. 2 is a fixed sleeve, having holes therein corresponding to the holes in the shaft, and having an opening at one side throughout its entire length, and of a width proportionate to its circumference, the opening being sufficient in width to allow the sleeve to be clamped tightly around the shafts before the sides of the opening shall come in contact. This sleeve is also provided, upon its outer circumference, with three equidistant, straight, and parallel ribs, extending the full length of its undressed or unfinished outer circumference. One of these ribs is bisected midway of its length by a transverse groove. 3 is a hollow cylinder, having at each end the eccentric cams 4 4 4, corresponding in relative distance to the ribs upon the sleeve 2. The ends of this cylinder are partially inclosed, leaving a sufficient opening to receive the sleeve, and on the inner circumference of these ends are cut the eccentric cams aforesaid. This cylinder has also midway of and upon its inner circumference a transverse flange, extending about one-fifth around such inner circumference, and corresponding in width to the said groove in one of the ribs of the sleeve 2. This cylinder is also provided with holes in its outer circumference, for the attachment of a spanner to revolve it upon the sleeve.

The operation of coupling the shafts is as follows: The sleeve is slipped onto one shaft one-half of the length of the sleeve, and revolved thereon until the holes in the sleeve and shaft are opposite, when an iron pin, fitting the holes and of length sufficient to come merely flush with the outside of the sleeve, is put through such holes, the holes in the sleeve and shaft being of the same diameter. The cylinder is then slipped over the sleeve in such way that the forward end of the flange in the cylinder shall pass close in the rear of the groove in one of the ribs of the sleeve, (what is "forward" and "rear" being determined by keeping in mind the direction in which the eccentric cams will allow the cylinder to be partially revolved upon the sleeve.) The cylinder in this position is moved sufficiently over the sleeve to allow of the insertion in the latter of the end of the other shaft, which second shaft is then inserted in the sleeve and pinned, as in the case of the first shaft. The cylinder is then drawn back upon the sleeve until the flange in the cylinder is opposite the groove in the rib of the sleeve. The cylinder is now partially revolved upon the sleeve, the flange passing into the groove and the eccentric cams in the ends of the cylinder, each tightening upon the ribs of the sleeve. By the use of a spanner, the sleeve, although of cast-iron, is rigidly compressed, and thus held upon the shafts, while the consequent spring of the sleeve fixes the pins immovably. The flange and groove are for the purpose of centering the cylinder upon the sleeve. The pin-holes in the shafts and sleeve are thus made near the sides of the same, to allow of greater spring to the sleeve.

I do not claim the pins, nor the method of their mere insertion, nor, generally, the cylinder; but

I claim—

1. The cylinder 3, furnished at each end with the eccentric cams 4 4 4.

2. The sleeve 2, provided with the outer ribs and with the opening, as described.

3. The combination of the sleeve 2 and the cylinder 3, as described, as and for the purpose above mentioned.

FREDRICK W. VERHAREN.

Witnesses:
 HENRY C. WARD,
 D. A. SMITH.